United States Patent
Neveu et al.

(10) Patent No.: US 7,946,909 B2
(45) Date of Patent: *May 24, 2011

(54) ORDERED EXECUTION OF ACTIONS IN A GAME ENVIRONMENT

(75) Inventors: Timothy D. Neveu, Foster City, CA (US); Jonathan H. Beard, Foster City, CA (US); Daniel Mueller, Foster City, CA (US); Keith Friedly, Foster City, CA (US); Erik R. Medina, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 956 days.

This patent is subject to a terminal disclaimer.

(21) Appl. No.: 11/591,314

(22) Filed: Oct. 31, 2006

(65) Prior Publication Data

US 2007/0060231 A1 Mar. 15, 2007

Related U.S. Application Data

(63) Continuation of application No. 09/773,452, filed on Jan. 31, 2001, now Pat. No. 7,137,891.

(51) Int. Cl.
*A63F 9/24* (2006.01)

(52) U.S. Cl. .............................................. 463/7; 463/37

(58) Field of Classification Search ................... 463/7, 8, 463/37

See application file for complete search history.

(56) References Cited

U.S. PATENT DOCUMENTS

| | | | |
|---|---|---|---|
| 5,947,823 A | 9/1999 | Nimura |
| 6,017,272 A | 1/2000 | Rieder |
| 6,210,273 B1 | 4/2001 | Matsuno |
| 6,273,818 B1 | 8/2001 | Komoto |
| 6,283,861 B1 | 9/2001 | Kawai et al. |
| 6,319,121 B1 | 11/2001 | Yamada et al. |
| 6,375,571 B1 | 4/2002 | Ohnuma et al. |
| 6,409,604 B1 | 6/2002 | Matsuno |
| 6,413,163 B1 | 7/2002 | Yamauchi et al. |
| 6,419,580 B1 | 7/2002 | Ito |
| 6,533,663 B1 | 3/2003 | Iwao et al. |
| 7,137,891 B2 | 11/2006 | Neveu et al. |

FOREIGN PATENT DOCUMENTS

EP  0 913 175  5/1999

(Continued)

OTHER PUBLICATIONS

Wikipedia Article on Diablo II, http://en.wikipedia.org/wiki/Diablo_II.*

(Continued)

*Primary Examiner* — Corbett B Coburn
(74) *Attorney, Agent, or Firm* — Carr & Ferrell LLP

(57) ABSTRACT

A system and method are disclosed for ordered execution of actions in a game environment is disclosed. An indication of a first object having been targeted in the game environment may be received whereby the object is assigned a first target slot. An indication of a second object having been targeted in the game environment may then be received, this second targeted object being assigned a second target slot. An action is then executed in the game environment with respect to each of the targeted objects in response to a command from an input device. The execution of the action with respect to each of the targeted objects may occur in accordance with an order defined by the target slots.

26 Claims, 13 Drawing Sheets

FOREIGN PATENT DOCUMENTS

| | | |
|---|---|---|
| JP | 07-178246 | 7/1995 |
| JP | 11-197359 | 7/1999 |
| JP | 2001-009156 | 1/2001 |

OTHER PUBLICATIONS

Diablo II Frost Nova Description, http://diablo2.diablowiki.net/Frost_Nova.*

FantaVision Game Manual, Sony Computer Entertainment, Inc. 2000.

Keith Diefendorff, "Sony's Emotionally Charged Chip," Microprocessor Report, vol. 13, No. 5, Apr. 19, 1999.

Wikipedia—The Free Encyclopedi, "AIMBOT," http://en.wikipedia.org/wiki/Aimbot, updated Jun. 3, 2005, last accessed Jul. 5, 2005.

* cited by examiner

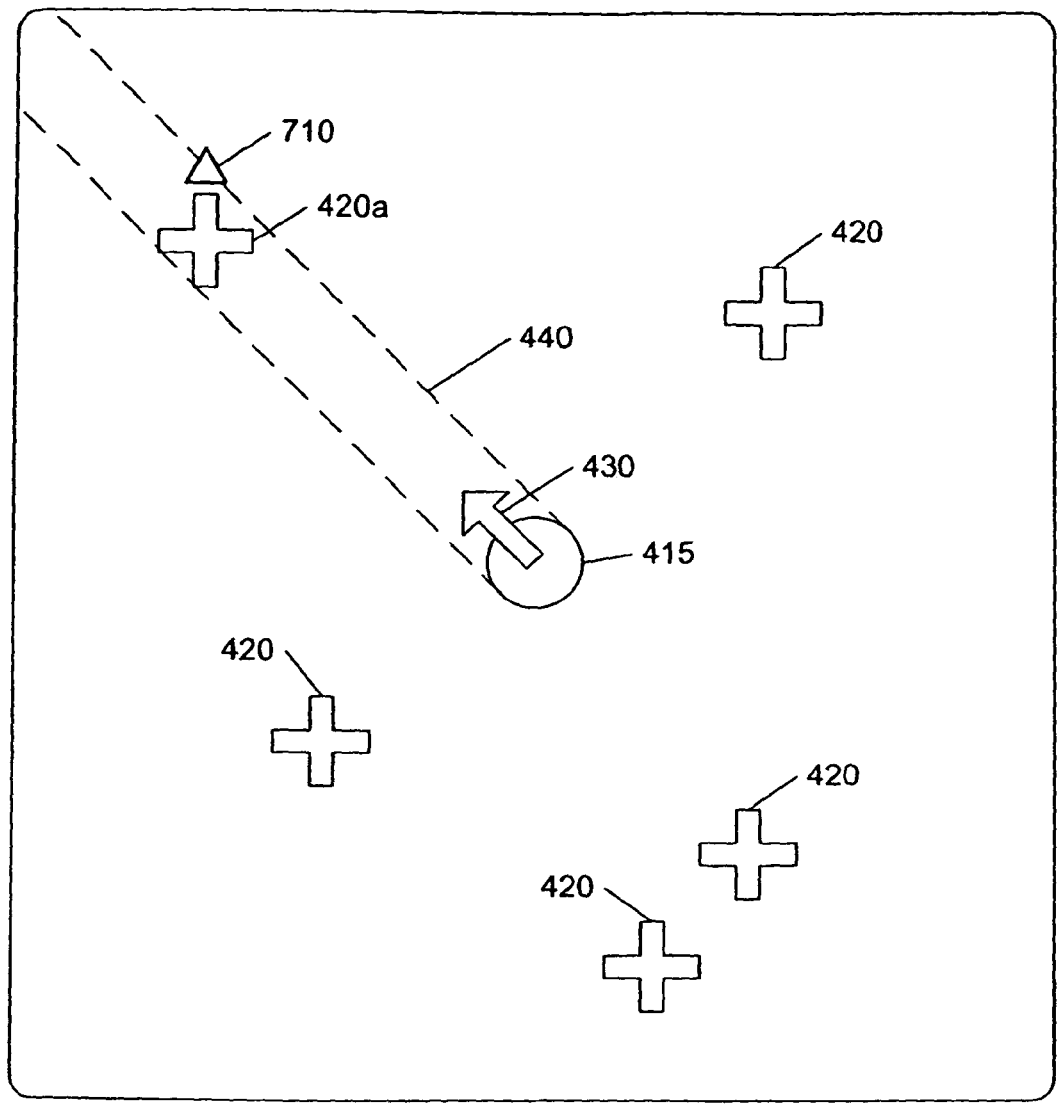
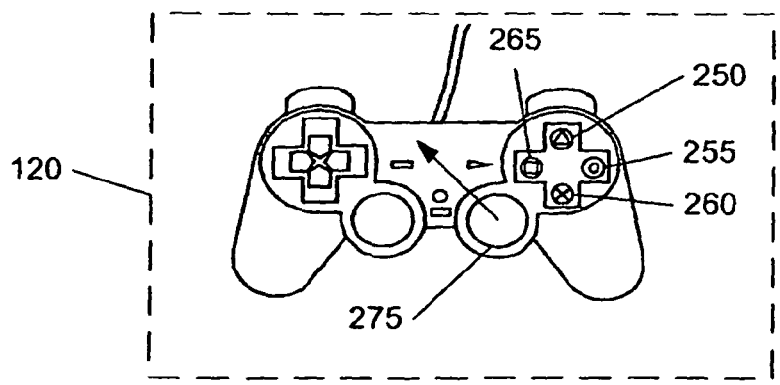
FIGURE 7

ORDERED EXECUTION OF ACTIONS IN A GAME ENVIRONMENT

CROSS-REFERENCE TO RELATED APPLICATIONS

This application is a continuation and claims the priority benefit of U.S. patent application Ser. No. 09/773,452 entitled "Game Playing System with Assignable Attack Icons" and filed Jan. 31, 2001 now U.S. Pat. No. 7,137,891. This disclosure of this application is incorporated herein by reference. The application is related to U.S. patent application Ser. No. 11/375,296 entitled "Game Playing System with Assignable Attack Icons" and filed Mar. 13, 2006.

BACKGROUND OF THE INVENTION

1. Field of the Invention

The present invention relates generally to video games and, more particularly, to targeting and attacking of objects in a video game system.

2. Description of the Related Art

In a video game, a game player is commonly represented by a video game character that can move about a virtual environment displayed on a display screen. The game player typically controls the character's actions using a video game controller that includes a joystick and one or more buttons. In one common type of game, the character encounters various scenarios throughout the course of the game. Such scenarios could include a competition scenario where the character competes against an opponent or a combat scenario where the character is required to fight and conquer one or more threats or enemies. The enemies typically approach the character from one or more directions on the display screen and then attack the character. The player uses the video game control to move the character and cause the character to attack enemies or defend against the enemy attacks using a weapon.

In order to engage an opponent or attack an enemy, the game player typically uses a joystick or direction button on the controller to maneuver the character so that the character is facing the enemy. The game player then presses a controller button, which is a button on the controller that causes the character to initiate an attack action, such as jabbing a sword or throwing a punch. The controller may include multiple controller buttons, each of which is associated with an attack action. Typically, a controller button is fixedly associated with an attack action. That is, when the player presses the button, the video game character always initiates the attack action regardless of whether the character is actually facing an enemy or even near an enemy.

It can be appreciated that video game combat is simplest when there are few enemies present simultaneously on the display screen, thereby making it relatively easy for the game player to correctly maneuver the character into an attack position so that the attack action has an affect on the desired enemy. For example, if there is only one enemy on the display screen, the game player can concentrate attention on the single enemy. Consequently, the game player can orient the character to face that enemy and initiate an attack on the enemy with relative ease.

However, as the number of enemies on the display screen increases, it becomes increasingly difficult for the player to attack specific enemies. The character may be surrounded by several enemies each of which moves about, making it difficult for the game player to correctly maneuver the character to face a specific enemy. The sheer number of enemies may also make it difficult for the game player to discern when the character is actually facing a specific enemy for attack. For example, if several enemies are grouped closely together, it may be unclear to the game player exactly which enemy the character is facing and, consequently, which enemy the character will attack upon pressing of the controller button. Unfortunately, this may result in the character initiating an attack on one enemy when the player actually intended to initiate an attack on a different enemy.

Another problem associated with simultaneously confronting multiple enemies is that it becomes difficult for the game player to attack a succession of different enemies. Under the conventional attack method, the game player has to orient the character toward a first enemy and then attack that enemy. In order to subsequently attack a second enemy, the game player must first maneuver the character so that the character is facing the second enemy. This can become quite cumbersome for the player, particularly if the second enemy is located at an awkward position relative to the character, such as behind the character or at a distance removed from the character. This often results in the player fumbling with the joystick and losing an attack opportunity. The requirement of re-orienting the character to the second enemy also takes time, which can be detrimental in an action game where characters must successfully and quickly attack enemies with success or otherwise risk incurring damage from the enemies.

The significance of the aforementioned problems only increases as the graphics processing power of video game systems increases. Modern video game systems are able to display and control an increasing number of enemy characters on the video game display at one time. Thus, it is becoming even more difficult and cumbersome for game players to target and attack specific enemies in a video game environment.

One way of overcoming the difficulty in targeting and attacking enemies is to simply provide the video game character with a larger weapon having a relatively large attack range. A larger attack range increases the likelihood of a successful attack regardless of whether the character is correctly oriented to an enemy. Consequently, larger weapons provide the game player with a greater margin of error in orienting the character relative to an enemy. For example, if the character is equipped with a small sword with a small attack range, then the player may have to precisely orient the character relative to an enemy in order to successfully attack the enemy. However, if the character is equipped with a large battle axe, then the character need only swing the battle axe in the vicinity of the enemy and rely on the large range of the weapon to encompass the enemy.

Unfortunately, such a solution results in a "hack and slash" combat scenario where the game player can disregard the video game character's orientation relative to an enemy. The player simply moves the character through a battle scene and wildly presses the controller button, hoping that the wide range of the resultant attacks will include a great number of enemies. While such hack and slash games can be fin, they are also simplistic and can result in the video game player quickly losing interest in the game. As game systems become more sophisticated, game players are demanding a richer and more realistic video game experience that both challenges the player and more closely simulates a real world scenario. Game players are also demanding an environment that provides greater opportunity to demonstrate game playing skills, such as showboating or using flourish or signature moves.

In a real world combat situation, an experienced fighter surrounded by multiple enemies could quickly target a specific enemy for attack and then successfully initiate an attack on the enemy. Additionally, in a real world situation, an experienced fighter could initiate attacks even if the fighter were not facing the enemy. Consequently, it would enrich the video game experience to allow players to easily and quickly target and attack specific enemies in a combat scenario.

SUMMARY OF THE INVENTION

In one exemplary embodiment of the present invention for method for ordered execution of actions in a game environment is disclosed. Through this method, an indication of a first object having been targeted in the game environment may be received. The first targeted object is assigned a first target slot. An indication of a second object having been targeted in the game environment is received; this second targeted object is assigned a second target slot. An action is then executed in the game environment with respect to each of the targeted objects in response to a command from an input device. The execution of the action with respect to each of the targeted objects may occur in accordance with an order defined by the target slots.

A computer-readable medium is also disclosed as an exemplary embodiment of the present invention. The medium may comprise a program that when executed by the processor of a computing device causes the computing device to perform a method for ordered execution of actions in a game environment as described above.

An exemplary system for ordered execution of actions in a game environment is disclosed herein. An embodiment of this exemplary system includes a controller interface coupled to an input control device. The input control device is configured to generate input control signals to manipulate actions in the game environment. A memory device and processor are also provided, the processor being coupled to the memory device and the controller interface. The processor is, in this exemplary embodiment, configured to receive input control signals from the input control device, the input control signals including instructions for the manipulation of a target interface displayed in the game environment. The processor is also configured to assign target slots to objects targeted through manipulation of the target interface in the game environment. The processor is still further configured to store information in the memory device, the information associating the assigned target slots with targeted objects. The processor is also configured to execute an action with respect to each of the targeted objects in response to a command received from the input control device. The execution of the action with respect to each of the targeted objects may occur in accordance with an order defined by the information in the memory device associating the assigned target slots with the targeted objects.

Other features and advantages of the present invention should be apparent from the following description of the preferred embodiment, which illustrates, by way of example, the principles of the invention.

BRIEF DESCRIPTION OF THE DRAWINGS

FIG. 7 is an illustration of a display screen produced by the video game system, showing a player character targeting an enemy character for attack and the corresponding controller actuation that would generate such targeting.

DETAILED DESCRIPTION

Figure 1:
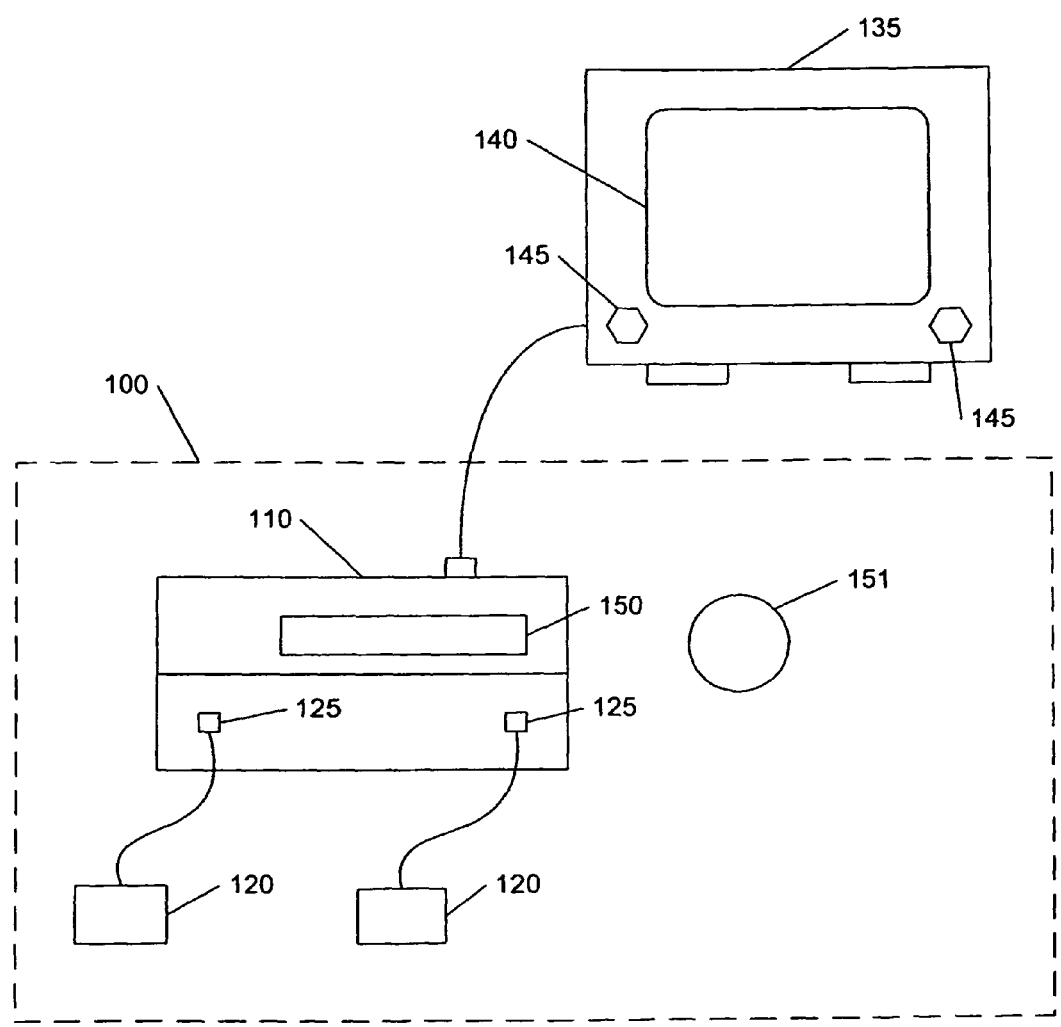
FIG. 1 is an illustration of a video game system constructed in accordance with the present invention.

FIG. 1 is a schematic illustration of an information processing or video game system 100. The video game system 100 includes a video game main unit 110 and one or more controllers 120 that are communicatively coupled to the main unit 110 via respective controller interfaces 125 on the main unit 110. The controllers 120 each comprise an input device for receiving user instructions.

The video game system 100 interfaces with an audio-visual (AV) output device 135 that is communicatively coupled to the main unit 110. The AV output device 135 includes a display screen 140 for displaying image data in accordance with signals received from the main unit 110. The AV output device 135 also includes one or more sound speakers 145 for outputting audio data in accordance with signals received from the main unit 110.

The main unit includes a program reader 150 that is configured to receive a game program storage medium, such as such as a magnetic floppy disk, an optical CD-ROM disc, a CD-R disc, a CD-RW disc, a DVD disk, or the like. The game program storage medium is a recording medium for supplying an application program such as a video game to the main unit 110. The main unit 110 is configured to process information and execute the program instructions located on the game program storage medium. The main unit 110 outputs image and sound data to the AV output device 135 in accordance with the program instructions. The main unit 110 receives user input from the controllers 120, as described in more detail below.

Figure 2:
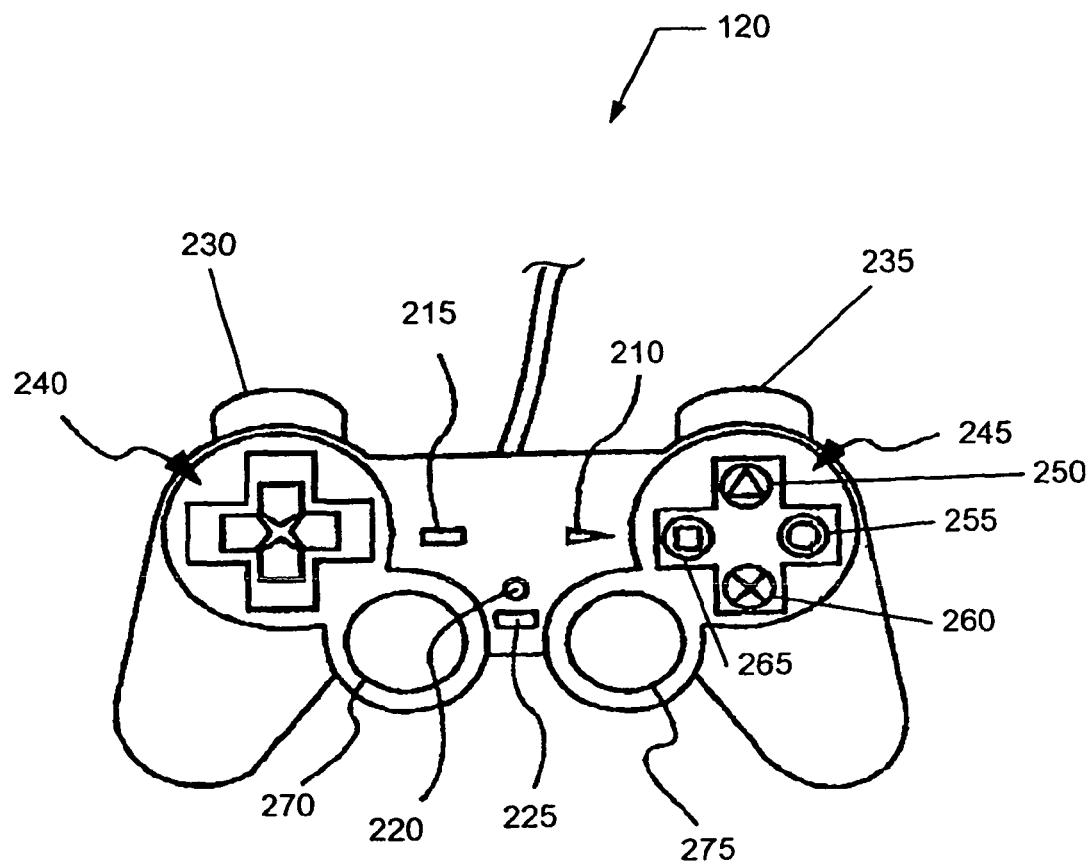
FIG. 2 is an illustration of a video game controller of the video game system illustrated in FIG. 1.

FIG. 2 is a detailed view of one of the controllers 120. The controller 120 includes one or more user input interfaces, such as buttons and/or joysticks, that allow a user to input various game commands. The controller 120 transmits signals regarding the state of the input interfaces to the main unit 110. For example, the controller 120 transmits a signal to the main unit 110 in response to actuation of the user input interfaces, such as pressing a button or moving a joystick on the controller 120.

The controller 120 preferably includes a start button 210 that allows a user to transmit a start command for a game program to the main unit 110. A selection button 215 on the controller 120 allows the user to select various game modes using a menu displayed on the AV output device 135. A mode selection button 220 can be used by the user to vary controller modes between digital and analog. An LED lamp 225 indicates a controller mode (analog or digital). The controller 120 also includes a left button 230 and a right button 235 that can be associated with inputs with respect to a game application.

The controller 120 includes a first game operational input 240 and a second game operational input 245. The second game operational input 245 preferably includes a plurality of controller buttons, including a first controller button 250, a second controller button 255, a third controller button 260, and a fourth controller button 265. Preferably, each controller button 250, 255, 260, 265 is associated with an identifier that may be used to identify and distinguish the controller buttons 250, 255, 260, 265. The identifier could comprise a symbol that is labeled on or near the associated controller button. For example, the first controller button 250 is associated with a triangle symbol, the second controller button 255 is associated with a circle symbol, the third controller button 260 is associated with an X symbol, and the fourth controller button 265 is associated with a square symbol. Preferably each symbol to be associated with a controller button is labeled on or near the corresponding controller button.

The controller 120 also includes first and second directional input interfaces, such as a first joystick 270 and a second joystick 275. The first and second joysticks 270, 275 preferably comprise sticks that may be positioned in a neutral position or moved into a non-neutral position by moving the stick in a particular direction. Movement of the joysticks 270, 275 into a non-neutral position in a given direction preferably results in the controller 120 outputting a corresponding directional command to the main unit 110 in a digital format, causing a corresponding movement in the video game environment. It will be appreciated that the configuration of the controller 120 could be modified to include more or less user input interfaces and also to vary the locations of the input interfaces.

Figure 3:
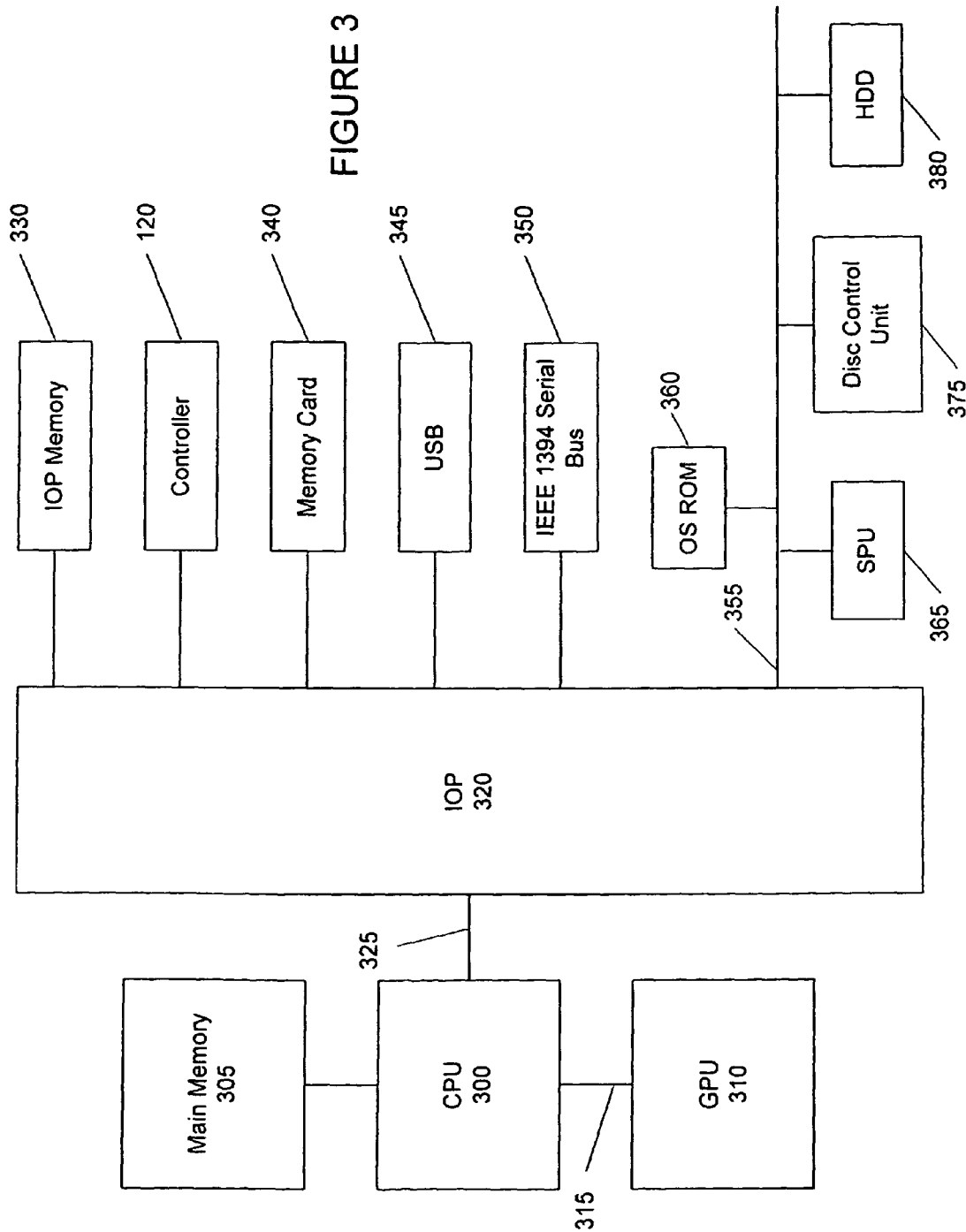
FIG. 3 is a block diagram of a hardware configuration of the video game system.

FIG. 3 is a block diagram of an exemplary hardware configuration of the entertainment system shown in FIG. 1. The video game system 100 includes a central processing unit (CPU) 300 that is associated with a main memory 305. The CPU 300 operates under control of programming steps that are stored in the OS-ROM 360 or transferred from a game program storage medium to the main memory 305. The CPU 300 is configured to process information and execute instructions in accordance with the programming steps.

The CPU 300 is communicatively coupled to an input/output processor (IOP) 320 via a dedicated bus 325. The IOP 320 couples the CPU 300 to an OS ROM 360 comprised of a non-volatile memory that stores program instructions, such as an operating system. The instructions are preferably transferred to the CPU via the IOP 320 at start-up of the main unit 110.

The CPU 300 is communicatively coupled to a graphics processing unit (GPU) 310 via a dedicated bus 315. The CPU 310 is a drawing processor that is configured to perform drawing processes and formulate images in accordance with instructions received from the CPU 300. For example, the CPU 310 may render a graphics image based on display lists that are generated by and received from the CPU 300. The CPU may include a buffer for storing graphics data. The GPU 310 outputs images to the AV output device 135.

The IOP 320 controls the exchange of data among the CPU 300 and a plurality of peripheral components in accordance with instructions that are stored in an IOP memory 330. The peripheral components may include one or more controllers 120, a memory card 340, a USB 345, and an IEEE 1394 serial bus 350. Additionally, a bus 355 is communicatively coupled to the IOP 320. The bus 355 is linked to several additional components, including the OS ROM 360, a sound processor unit (SPU) 365, an optical disc control unit 375, and a hard disk drive (HDD) 380.

The SPU 365 is configured to generate sounds, such as music, sound effects, and voices, in accordance with commands received from the CPU 300 and the IOP 320. The SPU 365 may include a sound buffer in which waveform data is stored. The SPU 365 generates sound signals and transmits the signals to the speakers 145 (FIG. 1).

The disc control unit 375 is configured to control the program reader 150 (FIG. 1), which can comprise, for example, an optical disk drive that accepts removable storage media such as a magnetic floppy disk, an optical CD-ROM disc, a CD-R disc, a CD-RW disc, a DVD disk, or the like.

The memory card 340 may comprise a storage medium to which the CPU 300 may write and store data. Preferably, the memory card 340 can be inserted and removed from the IOP 320. A user can store or save game data using the memory card 340. In addition, the video game system 100 is preferably provided with at least one hard disk drive (HDD) 380 to which game data may be written and stored.

A data I/O interface, such as an IEEE 1394 serial bus 350 or a universal serial bus (USB) 345 interface, is preferably communicatively coupled to the IOP 320 in order to allow data to be transferred into and out of the video game system 100.

Figure 4:
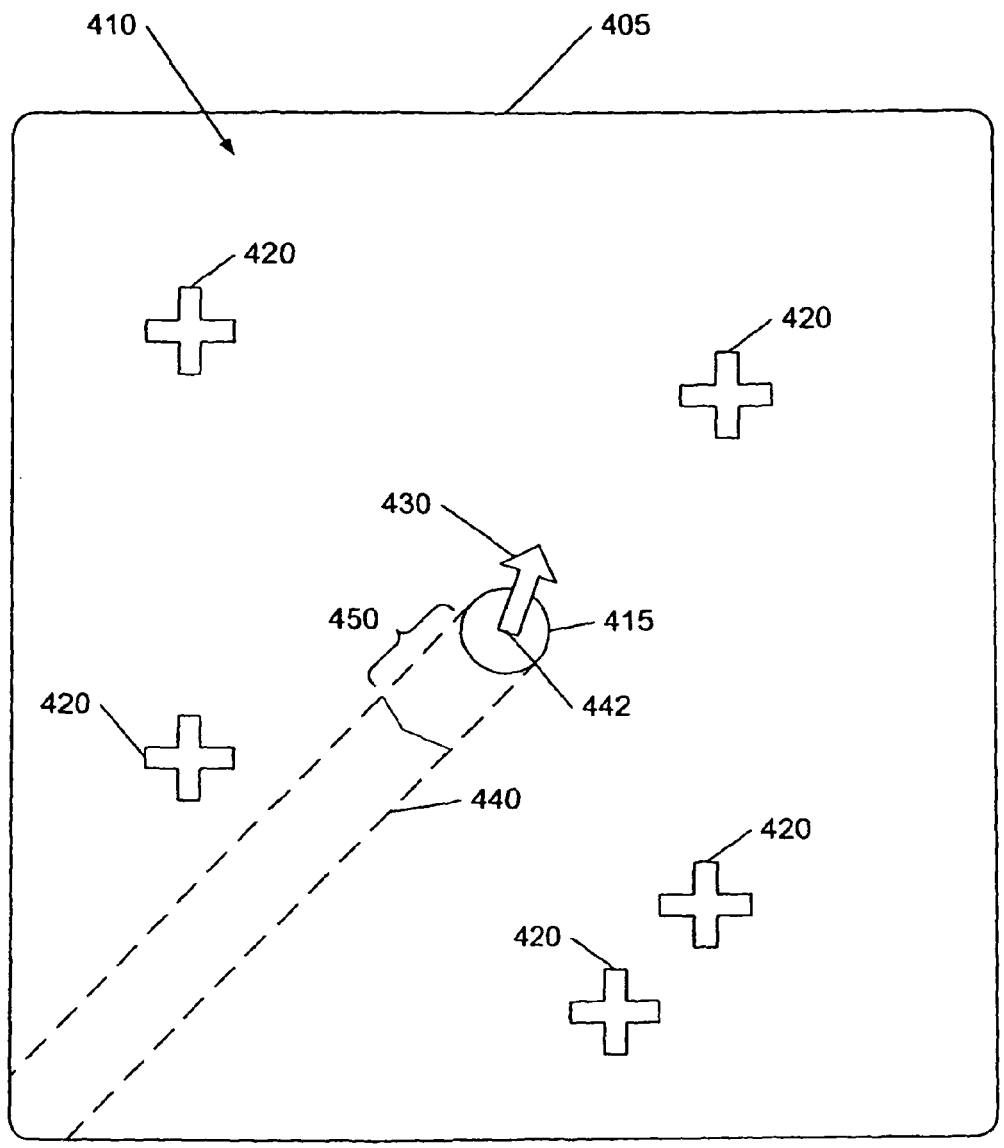
FIG. 4 is an illustration of a display screen produced by the video game system, showing a player character and several enemy characters.

The video game system 100 is configured to implement a game that is realized when the CPU 300 executes program instructions that are read from a program storage medium loaded in the main unit 110. FIG. 4 shows a video frame 405 of an image displayed on the display screen 140 of the AV output device 135 in the course of a combat scenario of the game. The image includes a portion of a game environment or virtual environment 410 that includes an initial object, such as a player character 415, and one or more candidate objects, such as opponents or enemy characters 420. The enemy characters can comprises other more abstract inanimate objects in the virtual environment 410. The player character 415 comprises a character object that is controlled by a game player. The enemy characters 420 comprise objects that are controlled by the CPU 300 or by another game player and are candidates for designation and action relating to the initial object, as described below. The enemy characters 420 are antagonistic to the player character.

For ease of illustration, the player character 415 is represented by a circle symbol and the enemy characters 420 are each represented by a cross symbol. However, in an actual game image the player character 415 and enemy characters 420 are preferably represented by images that resemble human, animal and/or monster anatomies.

In accordance with one aspect of the invention, the game player can designate candidate objects, such as by targeting enemy characters 420 for attack. The game player can then cause a predetermined action from the initial object with respect to the candidate object, such as causing the player character 415 to initiate an attack on the targeted enemy characters. When a player character initiates an attack on an enemy character, the player character attempts to inflict damage or harm on the enemy character. A targeted enemy character 420 is an enemy character 420 that may be attacked by the player character 415 when a controller button associated with the targeted enemy character is pressed. When one character successfully attacks another character, the character that was attacked incurs damage. Other video game scenarios may involve the player character engaging the designated candidate objects.

The targeting and attacking process generally proceeds as follows. First, one or more candidate objects comprised of enemy characters 420 may satisfy certain criteria for targeting such as being within a designation range, or target range, of the player character 415. This is further described below. The CPU 300 then classifies the appropriate enemy character(s) as a target and associates a controller input interface, such as a controller button on the controller 120, with the targeted enemy character(s). The game player can then actuate the input interface that is associated with the targeted enemy character, such as by pressing the controller button on the controller. In response to actuation of the input interface, the CPU 300 causes the player character to initiate an attack on the targeted enemy character. The player may be confident of a successful attack with a single actuation of the controller button if the targeted enemy is within an attack range of the player character. Advantageously, multiple enemies may be targeted at the same time. The game player can cause the enemy character to attack any targeted enemy character by actuating the controller button associated with the targeted enemy character.

Preferably, the CPU 300 manages the player character 415 as a player object comprised of a data structure that contains a profile of the player character. The player object data structure preferably includes as data a character identifier, a mode identifier, weapon data, attribute data, location data, and movement speed data. The character identifier comprises a code for identifying the player character object. Preferably, the CPU 300 maintains a similar data structure for each enemy character 420.

The mode identifier identifies the current mode of the player character 415. As described more fully below, the player character 415 can enter into a combat mode wherein the player character 415 can target and attack one or more enemy characters 420.

The active weapon data includes data regarding weapons that are available to the player character. The weapon data preferably includes a list of weapons that are in inventory as well as an identifier of a weapon for which the player character 415 is currently equipped. Preferably, the game player may equip the player character with a weapon using the controller 120.

The attribute data preferably relates to attributes of the player character, such as the player character's strength, vitality, dexterity, etc. Preferably, the attribute data also includes the current state of the character with respect to damage and fatigue.

The location data preferably comprises data regarding the location of the player character in the virtual environment 410. The location data may comprise coordinate data that indicates the location of the player character.

The movement speed data is indicative of a speed at which the player character moves in response to the video game player commands. The video game player can preferably move the player character 415 around the virtual environment 410 by actuating an input interface on the controller 120, such as by moving the first joystick 270 on the controller 120 (FIG. 2). The player character 415 preferably moves in a direction that corresponds to the direction that the player moves the first joystick 270. For example, the player character 415 preferably moves in an upward direction in the virtual environment when the game player moves the first joystick 270 in an upward direction. In another embodiment, the player character 415 moves in a frontward direction when the joystick 270 is moved upward. In another embodiment, the player character 415 moves in a direction that a first-person virtual camera is facing when the joystick 270 is moved upward.

With reference to FIG. 4, the player character 415 preferably has a front face that points in a particular direction, as exhibited by the front face indicator 430. In the illustrated embodiment, the front face indicator 430 comprises an arrow that shows which direction the player character is facing. However, the front face could also be indicated by the anatomy of the player character. For example, if the player character were in the shape of a human, then the front face could be indicated by a drawing rendition of a human having a face that points in a particular direction. When the game player moves the player character 415, the front face is reoriented to face in the direction that the player character is being moved.

As mentioned, the game player can preferably use the controller 120 to cause the player character 415 to enter into a combat mode. In combat mode, the game player can cause the player character 415 to initiate attacks on the enemy characters 410 and to defend against attacks initiated by the enemy characters 420. The game player preferably initiates combat mode by actuating an input interface on the controller 120, such as by moving the second joystick 275 (FIG. 2) in a desired direction.

When the second joystick 275 is moved away from a neutral position, a designation range indicator in the form of a target range indicator 440 is preferably displayed on the display screen 140. The target range indicator 440 comprises a visual indication of a target range for the player character 415. Preferably, the game player can target enemy characters 420 that enter or intersect the target range indicator 440 on the display screen. As mentioned, once an enemy character is targeted, the game player can cause the player character 415 to initiate an attack on the targeted enemy character by pressing a controller button that is associated with the enemy character. Preferably, the player character can successfully attack a targeted enemy character when the targeted enemy character is within the attack range of the player character's weapon.

In one embodiment, the target range indicator 440 comprises a bounded area that extends a distance radially outward from a base 442. The bounded area encompasses a predetermined region of the game environment shown on the display screen. The location of the base 442 preferably coincides with the location of the player character 415. Thus, as the player character 415 moves in the game environment, the base 442 follows the movement of the player character 415, with the target area 440 always extending radially outward from the base 442. The target range indicator 440 could have various shapes that encompass a given area of the display screen. The target range indicator could also comprise a single line that extends outwardly from the base 442.

Preferably, a portion of the target range indicator 440 includes an attack range indicator 450 comprised of a visual indication of the range that a single player attack move will cover.

When first activated, the target range indicator 440 preferably extends radially outward from the player character 415 in the direction that the joystick 275 has been moved. For example, in FIG. 4 the target range indicator 440 extends to the left and downward from the player character 415, which indicates that the game player moved the joystick 275 to the left and downward. The game player can change the orientation of the target range indicator 440 in two ways. First, the game player could return the joystick 275 to the neutral position, which preferably causes the target range indicator 440 to be removed from display. The game player could then move the joystick 275 in a different direction thereby causing the target range indicator 440 to be displayed along the new direction that the joystick 275 was moved.

Alternately, the game player could re-orient the target range indicator by maintaining the joystick 275 in a nonneutral position and then sweeping the joystick 275 in a circle or a portion thereof. The target range indicator 440 preferably then moves in conjunction with movement of the joystick 275. For example, if the game player sweeps the joystick 275 in a circular motion, the target range indicator 440 will sweep around the player character 415 in a circular motion. This type of movement of the target range indicator 440 is referred to herein as "sweeping" of the target range indicator 440. The direction of the target range indicator 440 and the front face direction of the player character do not necessarily coincide with one another.

In one embodiment, the size and shape of the target range indicator 440 is a function of the player character's attack capabilities. The player character's attack capabilities could vary depending on the weapon (if any) with which the player character 415 is equipped and the personal profile of the player character, such as the strength of the player character. In one embodiment, the current state of the player character, such as fatigue state or damage state, could also affect the size and shape of the target range indicator 440.

In one embodiment, the size of the target range indicator 440 depends solely on the attack capabilities of the weapon with which the player character is equipped. The attack capabilities of a weapon include the physical range of the weapon and the number of enemies that can be simultaneously attacked with the weapon. Each weapon preferably can damage a maximum number of enemies for a single swing or attack move of the weapon. Certain weapons may provide the player character the ability to attack several enemies with one swing or attack of the weapon. Preferably, the size and area covered by the target range indicator 440 increases as the attack capabilities of the weapon increase.

Figure 5:
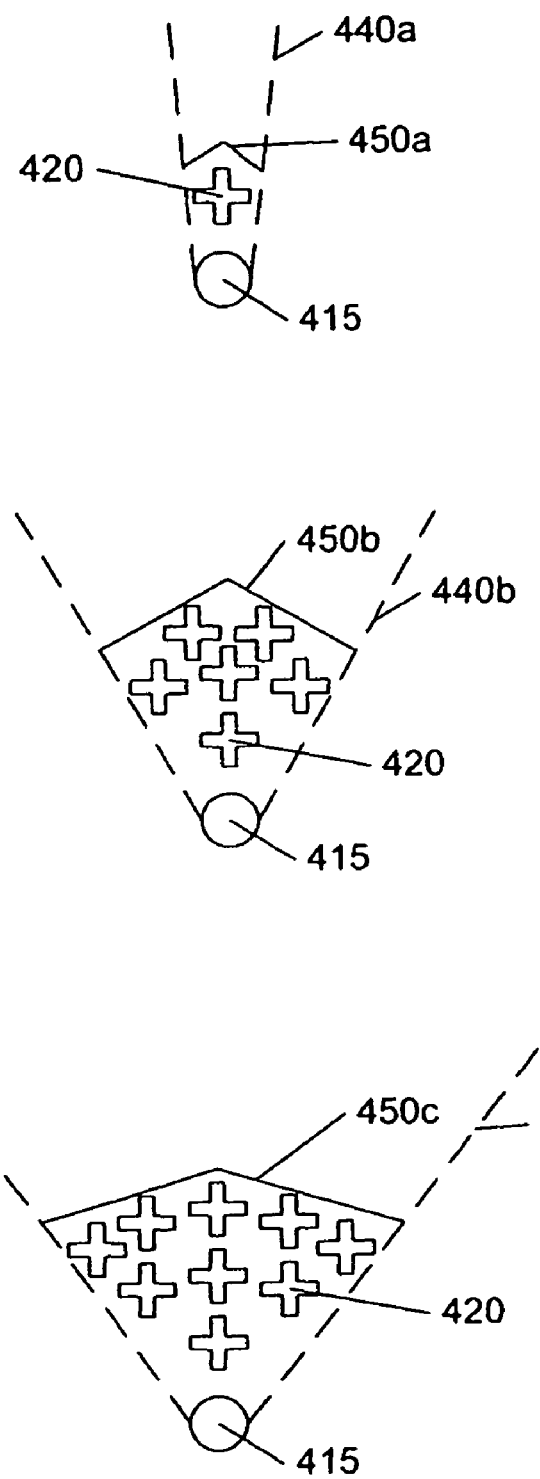
FIG. 5 is an illustration of several exemplary target range indicators that are displayed in association with a player character.

FIG. 5 shows three examples of differently sized target range indicators 440. The target range indicator 440a is for a sword weapon, the target range indicator 440b is for a taiaha weapon (which can attack more enemies at one time than a sword), and the target range indicator 440c is for an axe (which can attack even more enemies than a taiaha). The size of the target range indicator 440 varies as a function of the weapon. It will be appreciated that weapons named herein are exemplary and that the particular type of weapon could vary.

As shown in FIG. 5, the attack range indicator 450 for each target range indicator 440 is sized to encompass up to a maximum number of enemy characters 420. The number of enemy characters that fit within an attack range indicator indicates the attack capabilities of the corresponding weapon. For example, only one enemy character fits within the attack range indicator 450a for the sword. This indicates that the sword can only target one enemy character at a time. On the other hand, the attack range indicator 450c for the axe holds up to 6 enemy characters. This indicates that an axe can target a maximum of 9 enemy characters at one time (3 enemy characters per controller button). The attack range indicator 450b for the taiaha holds up to 6 enemy characters, indicating that the taiaha can target up to 6 enemy characters at once (2 enemy characters per attack button).

Figure 6:
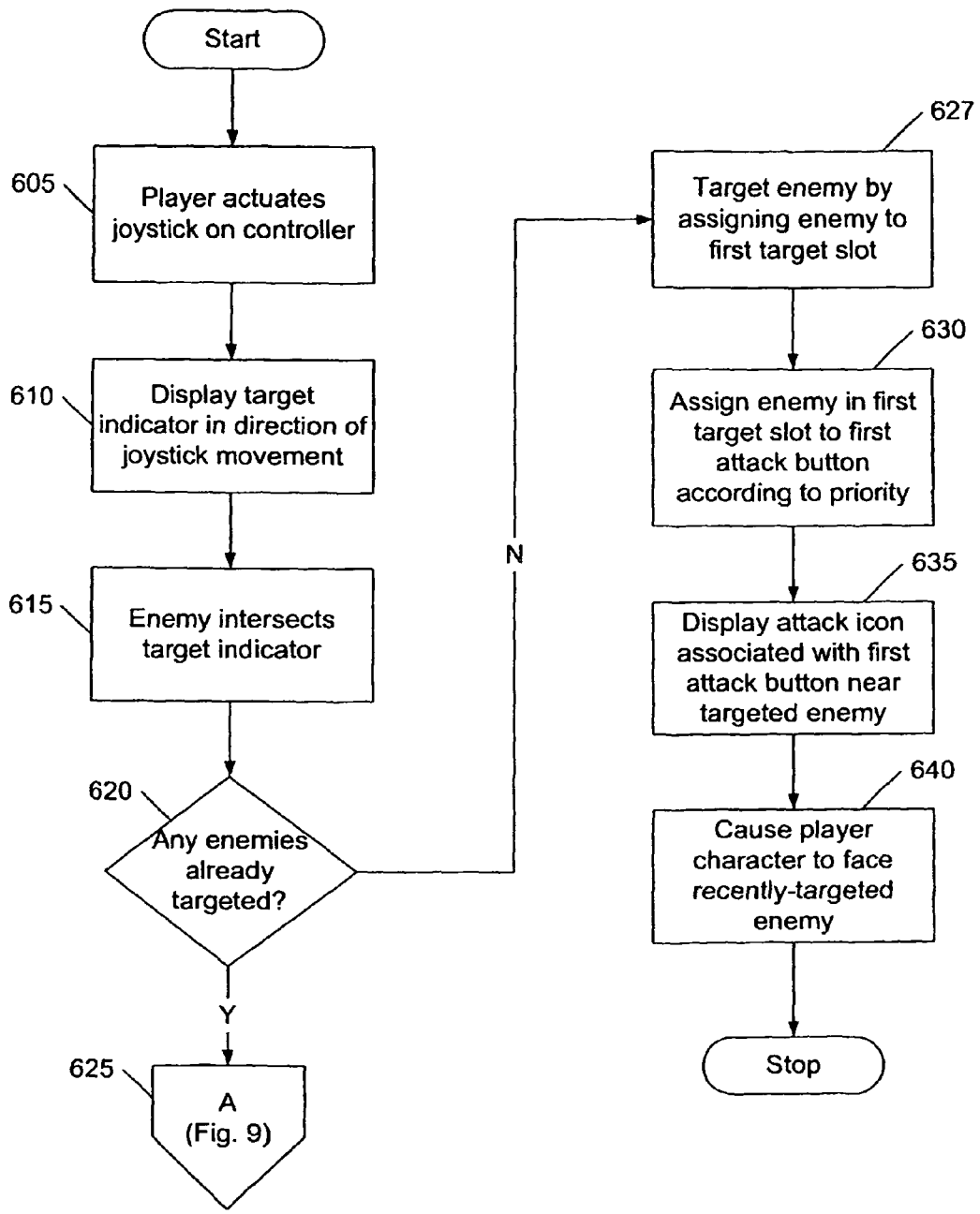
FIG. 6 is a flow diagram that illustrates the processing steps executed by the video game system to allow a game player to target one or more enemies for attack.

FIG. 6 is a flow diagram that illustrates the computer operations by which the game player may target one or more enemies for attack by the player character 415. In the first operation, represented by the flow diagram box numbered 605, the game player actuates the joystick 275 on the controller 120, such as by moving the joystick 275 in a particular direction. The CPU 300 detects that the joystick 275 has been actuated.

In the next operation, represented by the flow diagram box numbered 610, the CPU 300 causes the target range indicator 440 to be displayed in response to movement of the joystick 275. As mentioned, the target range indicator 440 extends radially outward from the player character 415 in a direction that corresponds to the direction in which the joystick 275 was moved. With reference to FIG. 7, the joystick 275 on the controller 120 has been moved upward and to the left, as exhibited by the arrow protruding from the joystick 275. Likewise, the target range indicator 440 also extends radially upward and to the left with respect to the player character 415.

A joystick is preferably used to activate the target range indicator 440 because a joystick allows the player to both activate the target range indicator 440 and specify a direction for the target range indicator 440 using a single input interface. However, it is envisioned that the game player could also activate the target range indicator 440 in other manners, such as by pressing a button on the controller 120 or by actuating a combination of input interfaces.

In the next operation, represented by the flow diagram box numbered 615, at least one enemy character 420a intersects at least a portion of the area covered by the target range indicator 440. The CPU 300 could detect such intersection, for example, by monitoring the location coordinates of the enemy characters 420. The CPU 300 could periodically compare the location coordinates of each enemy character 420 with respect to the area of the target range indicator 440. The CPU 300 could then determine whether there is any overlap between an enemy location and the area encompassed by the target range indicator 440.

An enemy character 420 could come to intersect the target area 440 in several ways. In a first way, the game player could activate the target range indicator 440 so that it initially intersects an enemy character 420 by simply moving the joystick 275 in the direction of the enemy character 420. The target range indicator 440 would thus initially be displayed in intersection with an enemy character 420, such as is shown in FIG. 7.

In another way, the game player could activate the target range indicator 440 so that it initially does not intersect with an enemy character 420, such as is shown in FIG. 4. The game player could then sweep the target range indicator 440 using the joystick 275 to change the orientation of the target range indicator 440. In this manner, the game player may cause the target range indicator 440 to intersect an enemy character 420 that is located along the sweep path of the target range indicator 440.

An enemy character 420 could also come to intersect the target range indicator 440 through movement of the location of the player character 415, movement of the location of an enemy character 420, or a combination thereof. For example, the game player could fix the position of the target range indicator 440 by holding the joystick 275 in a fixed position. The game player could then rely on the movement of an enemy character to bring the enemy character within the region of the target range indicator 440. Advantageously, the various ways of intersecting the enemy characters with the target range indicator 440 adds a strategic facet to the game, as the game player could manually choose a specific enemy target or could rely on enemy movement to designate targets.

The CPU 300 preferably maintains in memory one or more target slots that are used to keep track of targeted enemies. A target slot could comprise a memory location that can store the identifier codes of one or more enemies. When one or more enemy character 420 intersects the target range indicator 440, the CPU 300 considers whether to assign the enemy characters 420 to a target slot. In one embodiment, the total number of target slots is less than or equal to the number of controller buttons on the controller 120. In the illustrated example, there are 4 controller buttons 250, 255, 260, 265, so there can be a maximum of 4 target slots available at one time. It will be appreciated that less than the total quantity of controller buttons 250, 255, 260, 265 could be used for attack and that any combination of the controller buttons 250, 255, 260, 265 could be used for attack.

Figure 9:
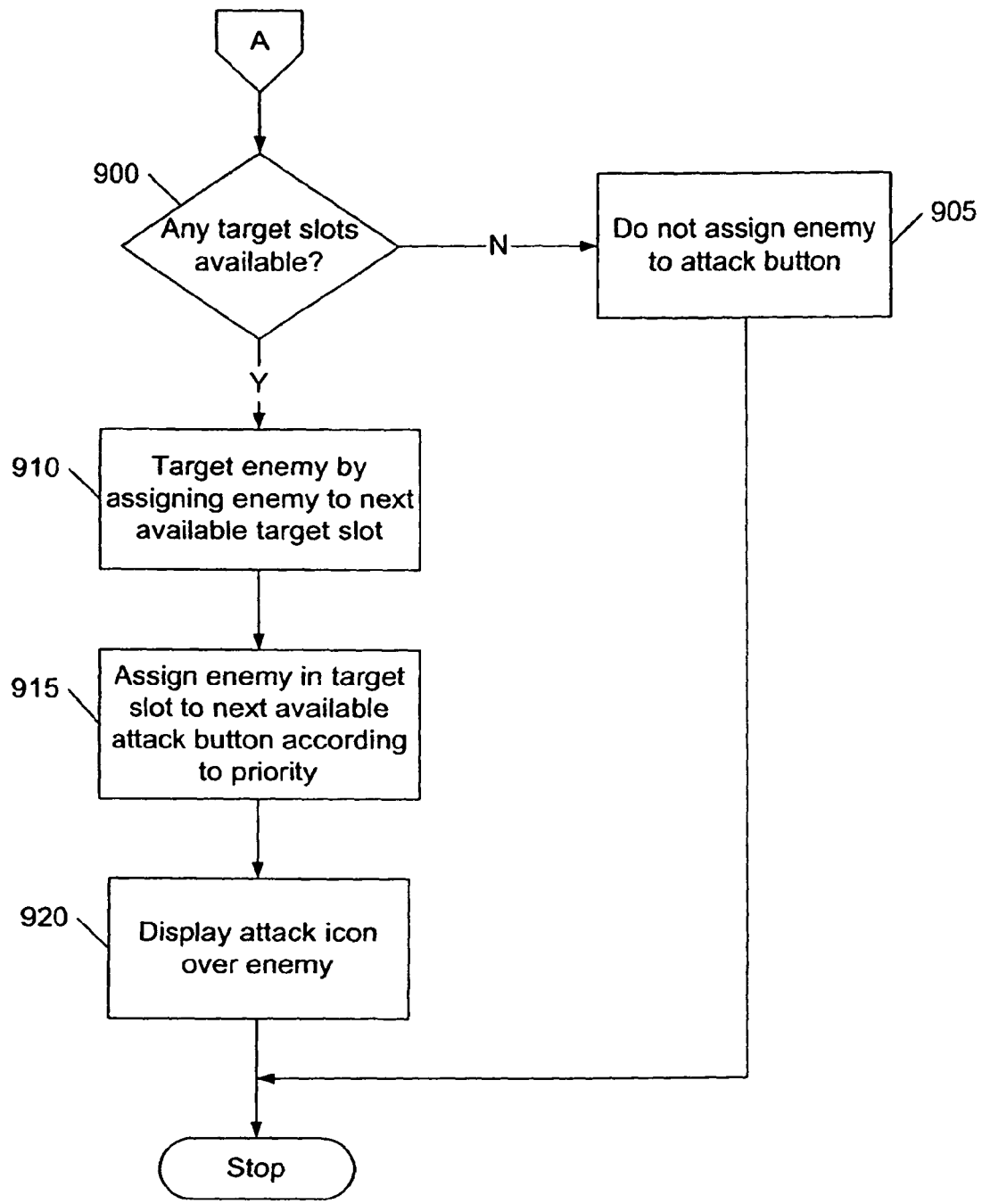
FIG. 9 is a flow diagram that illustrates additional processing steps executed by the video game system to allow a game player to target one or more enemies for attack.

With reference again to FIG. 6 the next operation is represented by the flow diagram decision box numbered 620. After an enemy character 420 has intersected the target range indicator 440, the CPU 300 determines whether any enemy characters 420 have already been targeted. That is, the CPU 300 determines whether any target slots have yet been assigned to an enemy character 420. If the CPU 300 determines that at least one target slot is already filled, then the CPU 300 proceeds to the operation described in the flow diagram of FIG. 9, as represented by the flow diagram box numbered 625. The flow diagram of FIG. 9 is described in more detail below.

However, if no enemy characters 420 have yet been targeted, then in the next operation, the CPU 300 targets the enemy character 420a by assigning the enemy character 420a to a first target slot. This is represented by the flow diagram box 627. This could be accomplished, for example, by the CPU 300 writing the identifier code for the enemy character 420a to a predetermined memory location that is associated with the first target slot.

It is possible that plural enemy characters 420 may simultaneously intersect the target range indicator 440. If multiple enemies simultaneously intersect the target range indicator 440, then the CPU 300 can assign multiple enemy characters 420 to the same target slot as a group. The maximum number of enemy characters 420 that can be assigned to a single target slot is preferably limited by the attack capability of the player character's weapon. For example, if the player character 420 is using a sword, then only one enemy character 420 can be assigned to a target slot even if more than one enemy character 420 is intersecting the target range indicator 440. This is because the sword can only attack one enemy character 420 at one time. However, if the player character 415 is using the taiaha, then more than one enemy character 420 can be assigned to a target slot as long as the enemy characters 420 are simultaneously intersecting the target range indicator 440.

Figure 8:
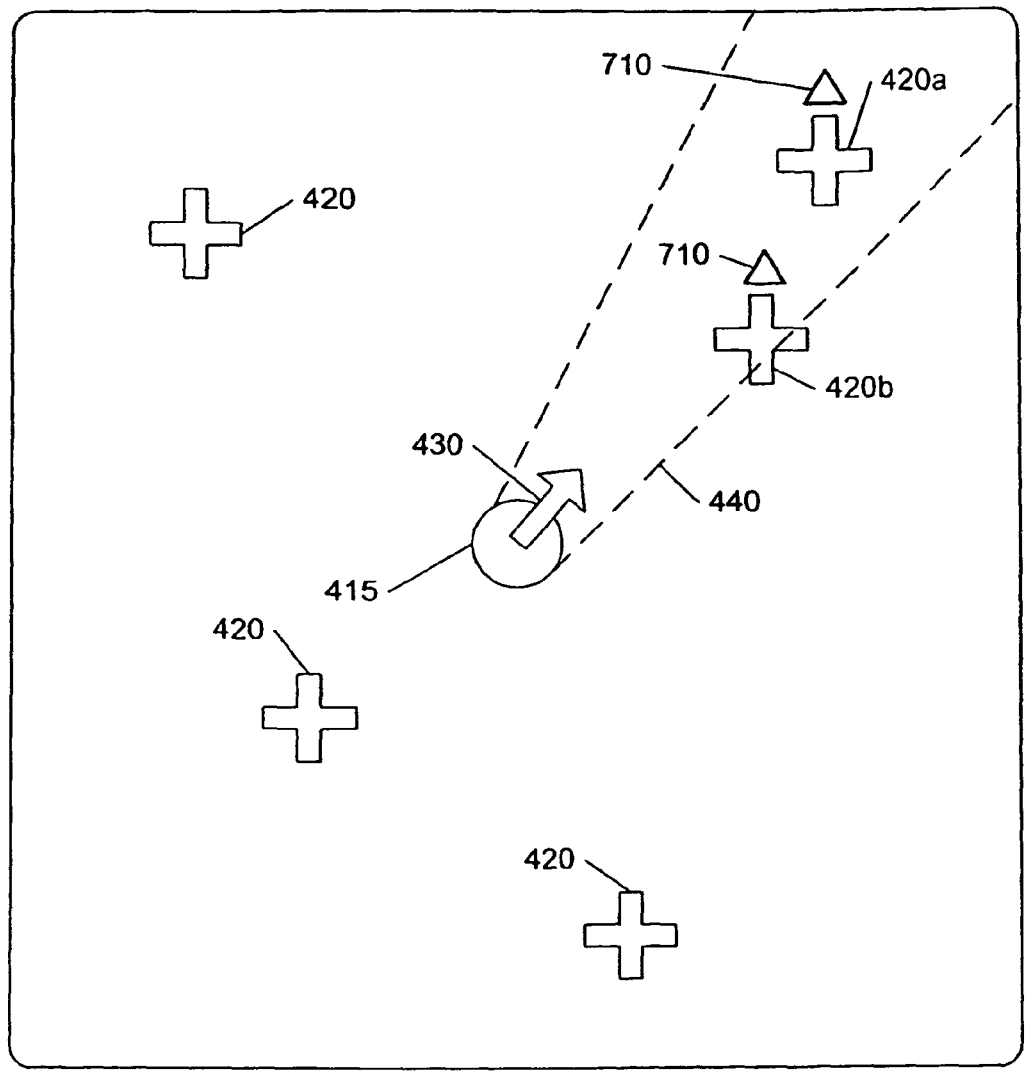
FIG. 8 is an illustration of a display screen produced by the video game system, showing a player character targeting a pair of enemy characters for attack.

An example of this situation is shown in FIG. 8, where a pair of enemy characters 420a and 420b are located at least partially within the area encompassed by the target range indicator 440. If the player character is using the taiaha, then both enemy characters 420a and 420b will be assigned to the same target slot as the taiaha can assign up to two enemy characters at once to a controller button. However, if the player were using the sword, then only one enemy character 420 would be assigned to the target slot. Preferably, the CPU 300 first assigns target slots to the enemy characters 420 that are nearest the player character 415. The game player could sweep the target range indicator 440 to include multiple enemy characters 420.

In the next operation, represented by the flow diagram box numbered 630, the CPU 300 associates the enemy(s) in the first target slot with one of the controller buttons 250, 255, 260, or 265. This may be accomplished, for example, by the CPU 300 writing the enemy character identifier codes to a memory location that is associated with a particular controller button. As described below with respect to FIG. 11, the game player can then cause the player character 415 to attack an enemy character by pressing the controller button that is associated with the enemy character.

Preferably, the target slots are associated to the controller buttons 250, 255, 260, 265 according to a predetermined hierarchy. That is, the target slots are always associated to the controller buttons 250, 255, 260, 265 in a predetermined order. For the controller 120 shown in FIG. 2, the first controller button 250 is the first in the order, the second controller button 255 is the second in the order, the third controller button is the third in the order, and the fourth controller button 265 is the last in the order. It will be appreciated that the order of priority may be varied and that the number of controller buttons that are used for attacking could also be varied.

In the next operation, represented by the flow diagram box numbered 635, the CPU 300 causes a visual controller button indication to be displayed in association with the targeted enemy character 420a. The visual controller button indication provides the game player with an indication of which controller button has been associated with the targeted enemy character. The visual indication could be anything that indicates to the player that an enemy character is targeted and that also indicates the associated controller button to the player. For example, the visual indication could comprise the targeted enemy character changing color or glowing in a color that corresponds to the color of a controller button.

In one embodiment, the visual indication comprises an attack icon 710 comprised of a symbol that is associated with or identifies a controller button 250, 255, 260, or 265. Preferably, the game player can look at the attack icon 710 and easily identify which controller button 250, 255, 260, or 265 is associated with the attack icon 710. Preferably, the attack icon 710 is visually similar or identical to the identifier that is labeled on the controller button that was associated with the recently targeted enemy character 420a. In the example shown in FIG. 7, the first controller button 250 shown in FIG. 2 is associated with the targeted enemy character 420a. The first controller button 250 has a triangle for an identifier symbol. Thus, the attack icon 710 also comprises a triangle. If a group of enemy characters 420 are in the same target slot, then the attack icon 710 is displayed over each targeted enemy character in the group. Thus, in FIG. 8, the triangle attack icon 710 appears over enemy characters 420a and 420b. It will be appreciated that the attack icon could comprise any symbol that will help the user to identify which controller button has been associated with a targeted enemy character.

With reference again to FIG. 6, in the next operation, represented by the flow diagram box numbered 640, the CPU 300 reorients the player character 415 to face toward the recently-targeted enemy character 420a. An example of this is shown in FIG. 7, where the front face indicator 430 points toward the recently targeted enemy character 420a. This indicates that the player character 415 is now facing the enemy character 420a. If a group of enemy characters 420 has been targeted, then the player character 415 preferably faces the nearest enemy character 420 in the group. Alternately, the player character 415 could face toward a predetermined location with respect to the group, such as the center point of the group. The operation then ends.

As discussed above, the flow diagram shown in FIG. 9 describes the computer operations that are performed in the situation where at least one target slot is already filled and the user attempts to target an additional enemy. In the first operation, represented by the flow diagram box numbered 900, the CPU 300 determines whether any target slots are available. A target slot is available if it is not already filled with an identifier code for an enemy character. If there are not any target slots available, this indicates that all target slots have already been filled with enemies.

If this is the case, the CPU 300 then proceeds to the next operation, represented by the flow diagram box numbered 905. In this operation, the enemy 920a is not assigned to a target slot. Rather, the game player must wait until a target slot is free before another enemy can be targeted. Preferably, there are several ways that an assigned target slot can be freed for reassignment. One way is for the enemy character to be killed, such as a result of an attack by the player character 415. A target slot may also be freed if the enemy character moves a predetermined distance away from the player character. If a group of enemy characters are assigned to one target slot, then the CPU 300 must removed all the enemy characters in the group from the target slot before the target slot is classified as free. Thus, all of the enemy characters would have to be killed or moved away from the player character the predetermined distance. When all enemy characters 420 have been removed from a target slot, then the target slot and the associated controller button are free for reassignment.

Figure 10:
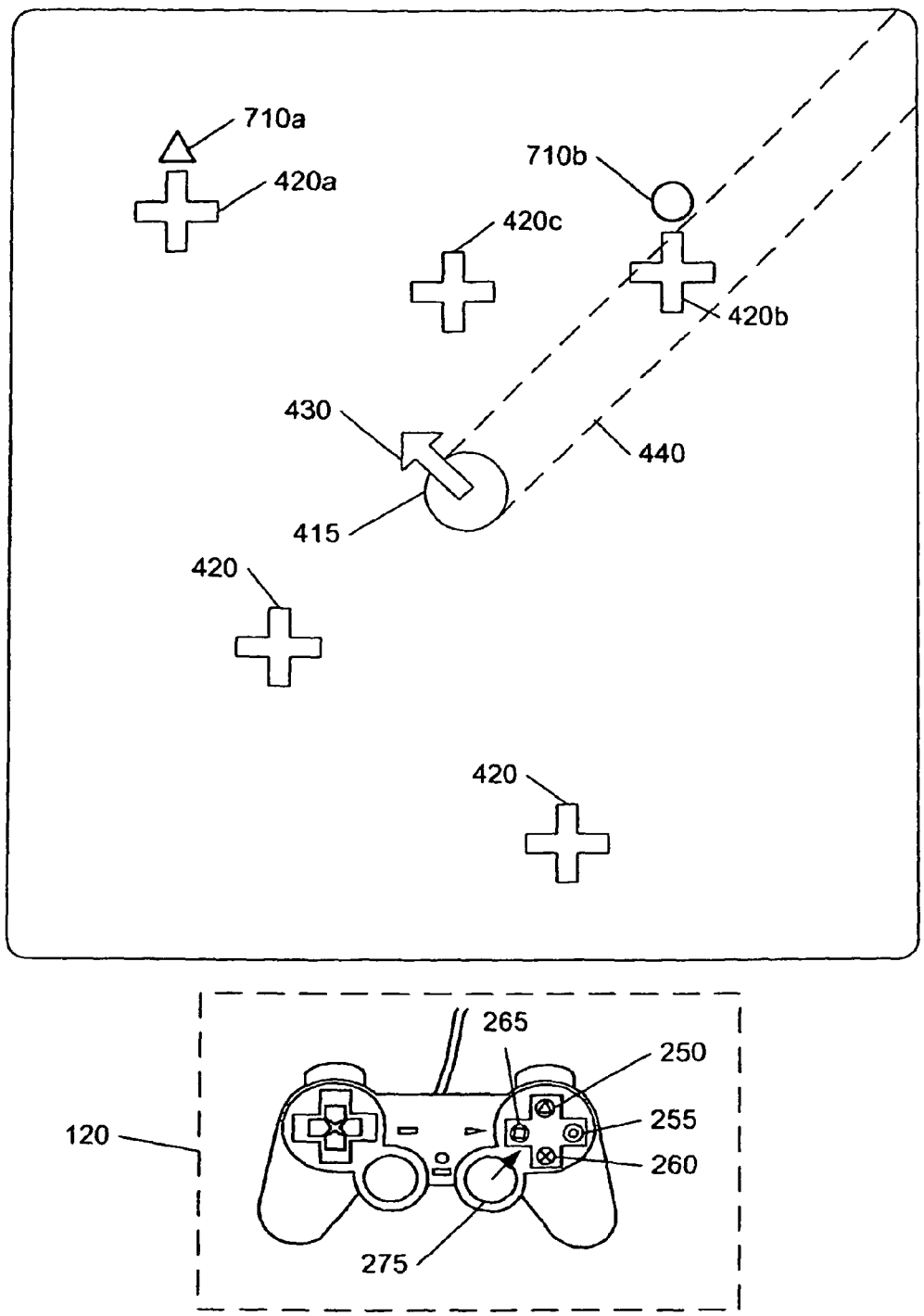
FIG. 10 is an illustration of a display screen produced by the video game system, showing a player character targeting a subsequent enemy for attack.

If the CPU 300 determines that there are indeed target slots available, then the CPU 300 proceeds to the next operation, represented by the flow diagram box numbered 910. In this operation, the CPU 300 targets the enemy character by assigning the enemy character to the next available target slot. This is described with reference to FIG. 10. FIG. 10 shows that a second enemy character 420b has intersected the target range indicator 440. Furthermore, at least one other enemy character, enemy character 420a, has already been targeted, as indicated by the attack icon 710a over the enemy character 420a. In this example, the CPU 300 would assign the enemy character 420b to the next available target slot.

With reference again to FIG. 9, in the next operation, represented by the flow diagram box numbered 915, the CPU 300 associates the targeted enemy(s) in the recently-filled target slot with one of the controller buttons 250, 255, 260, or 265 according to the aforementioned priority order. In the example shown in FIG. 10, only the first controller button 250 has been associated with an enemy and controller buttons 255, 260, and 265 are free. The second controller button 255 is thus the next available controller button in the priority order. Thus, the CPU 300 associates the targeted enemy character 420b with the second controller button 255. If the second controller button 255 had already been associated with an enemy character 420, then the CPU 300 would have associated the enemy character 420b with the next available controller button in the priority order.

In the next operation, represented by the flow diagram box numbered 920, the CPU 300 causes an attack icon 710b associated with the second controller button 255 to be displayed over the targeted enemy character 420b. In the case shown in FIG. 10, the second controller button 255 was associated with the targeted enemy character 420b. The second controller button 255 has a circle for an identifier symbol. Thus, the attack icon 710b is in the shape of a circle. The operation then ends.

Figure 11:
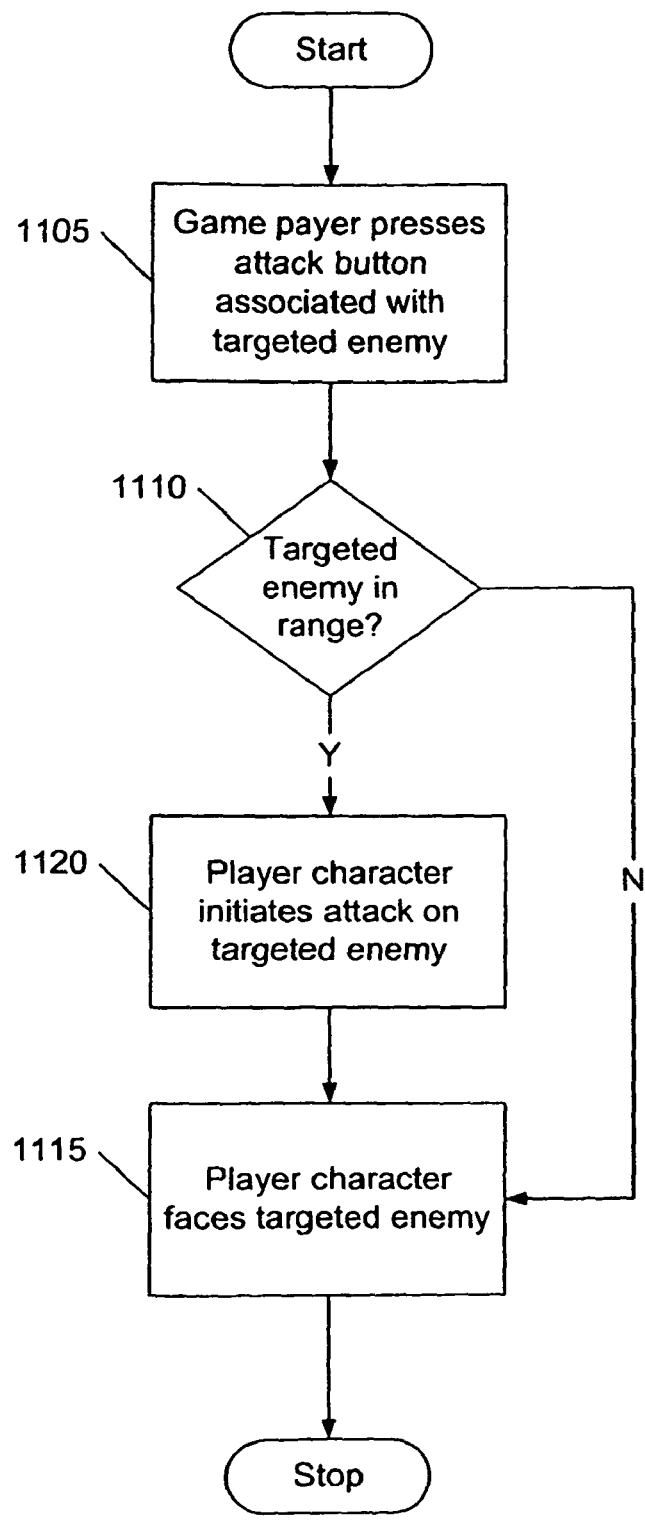
FIG. 11 is a flow diagram that illustrates the processing steps executed by the video game system to allow a game player to attack a targeted enemy.

FIG. 11 shows a flow diagram that illustrates the computer operations by which the game player may cause the player character to attack a target enemy. The process is further described with respect to FIG. 12, where there is illustrated a player character 415 and several enemy characters 420, including two targeted enemy characters 420a and 420b that are associated with the first controller button 250 and the fourth controller button 265, respectively.

In the first operation, represented by the flow diagram box numbered 1105, the CPU 300 detects that the game player actuates an input interface that is associated with a targeted enemy 420. For example, with respect to FIG. 12, the game player could press either the first controller button 250, which is associated with the targeted enemy character 420a, or the fourth controller button 265, which is associated with the targeted enemy character 420b.

In the next operation, represented by flow decision box numbered 1110, the CPU 300 determines whether the targeted enemy is in range for attack. As mentioned, the player character 420 uses weapons that each have a particular attack capability, including an attack range. If the targeted enemy character is not within the player character's attack range, the CPU 300 causes the player character to face the targeted enemy character without initiating an attack. This operation is represented by the flow diagram box numbered 1115. In the example shown in FIG. 12, this would correspond to the game player pressing the first controller button 250, which is associated with the targeted enemy character 420a. The front face indicator 430 points toward the enemy character 420a, indicating that the player character 415 is facing the enemy character 420a. The enemy character 420a is presumed to be out of the player character's attack range.

Figure 12:
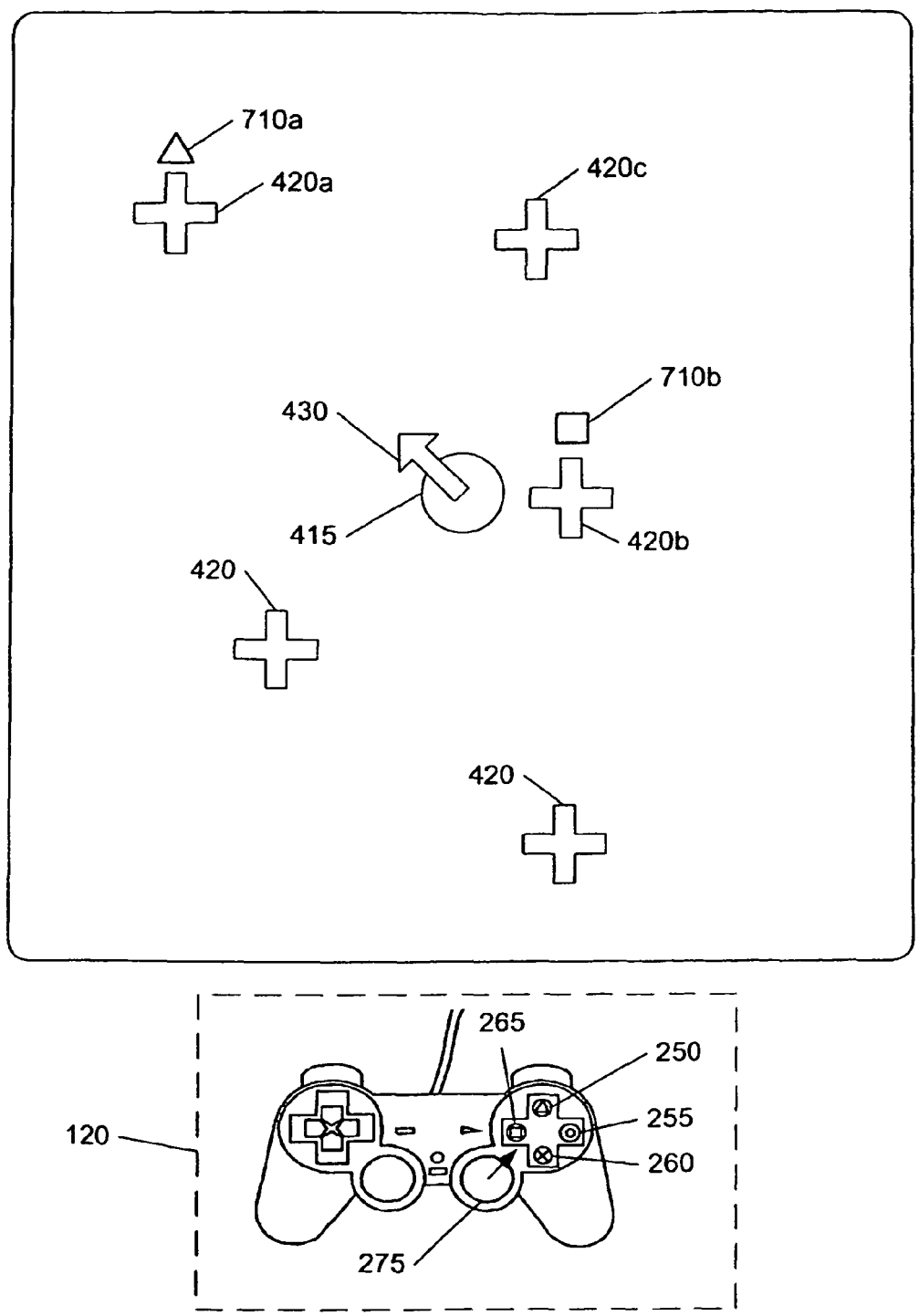
FIG. 12 is an illustration of a display screen produced by the video game system, showing a player character and a targeted enemy character in attack range.

However, if a targeted enemy character is within range, then pressing of the controller button associated with the targeted enemy character causes the player character to attack the targeted enemy character. This is represented by the flow diagram box numbered 1120 in FIG. 11. With reference to FIG. 12, this would correspond to the game player pressing the fourth controller button 265, which is associated with the targeted enemy character 420b. If the game player presses the fourth controller button, then the player character 415 will initiate an attack on the enemy character 420b. The enemy character 420b is assumed to be within the player character's attack range.

Advantageously, the player character does not need to be facing an enemy character in order to attack an enemy character. Preferably, the player character can initiate attacks on enemy characters even when not facing the enemy character. For example, the player character could initiate a behind-the-back sword swing on an enemy character located behind the player character, or a sideways swing on an enemy character to the side. In such a case, the CPU 300 would initiate an animation wherein the player character attacks the enemy character while not facing the enemy character. This advantageously increases the number of available attack moves, which increases enjoyability of the game. It also makes it easier for a game player to attack specific enemy characters. The game player can cause the player character to attack any targeted enemy character by simply pressing the controller button associated with the target, regardless of whether the player character is actually facing the enemy character. Preferably, after the first attack is initiated on an enemy character, the CPU 300 causes the player character to turn and face the enemy character, as represented by the flow diagram box numbered 1115.

The game player can preferably cause the player character to initiate special attacks by pressing a combination of buttons on the controller. In one embodiment, the game player uses the unassigned controller buttons, if any, to initiate special attacks. For example, in FIG. 12, the second and third controller buttons 255, 260 are not associated with any targets. If the game player presses one of the unassigned buttons immediately after pressing an assigned controller button, then the CPU 300 causes the player character to initiate a special attack on the targeted enemy character. A special attack could comprise a combination of attack moves or one or more unique attack moves. For example, a particular player character could have a special signature move that is unique to the player character, such as a unique swing or flourish move.

If the game player presses a controller button that is associated with a group of player characters, then the player character preferably attempts to attack as many of the enemy characters in the group as possible. For example, if the player character is using a taiaha, then the player character attempts to attack the maximum number of enemy characters that can be attacked with a taiaha. The game player can maneuver the player character into a location that will maximize the attack range.

In addition to providing an indication of the associated controller button, the attack icon 710 (FIG. 7) preferably provides status indications to the game player. The CPU 300 preferably causes the attack icon for an enemy to change visual state in response to the status of an enemy character. Preferably, an enemy character's attack icon 710 is in a first visual state, such as in a brightened state, when the enemy character is in range to be attacked by the player character. The attack icon 710 changes to a second visual state, such as a semitransparent state, if the associated enemy target is out of range of attack for the player character. The attack icon could also change to a third visual state, such as a flashing state, when the associated enemy target is close enough to be hit but will be missed if attacked. In one embodiment, the attack icon changes to the flashing state to indicate that the enemy is about to be de-targeted, such as when the enemy character is about to die or if the enemy character is about to move out of attack range.

Figure 13:
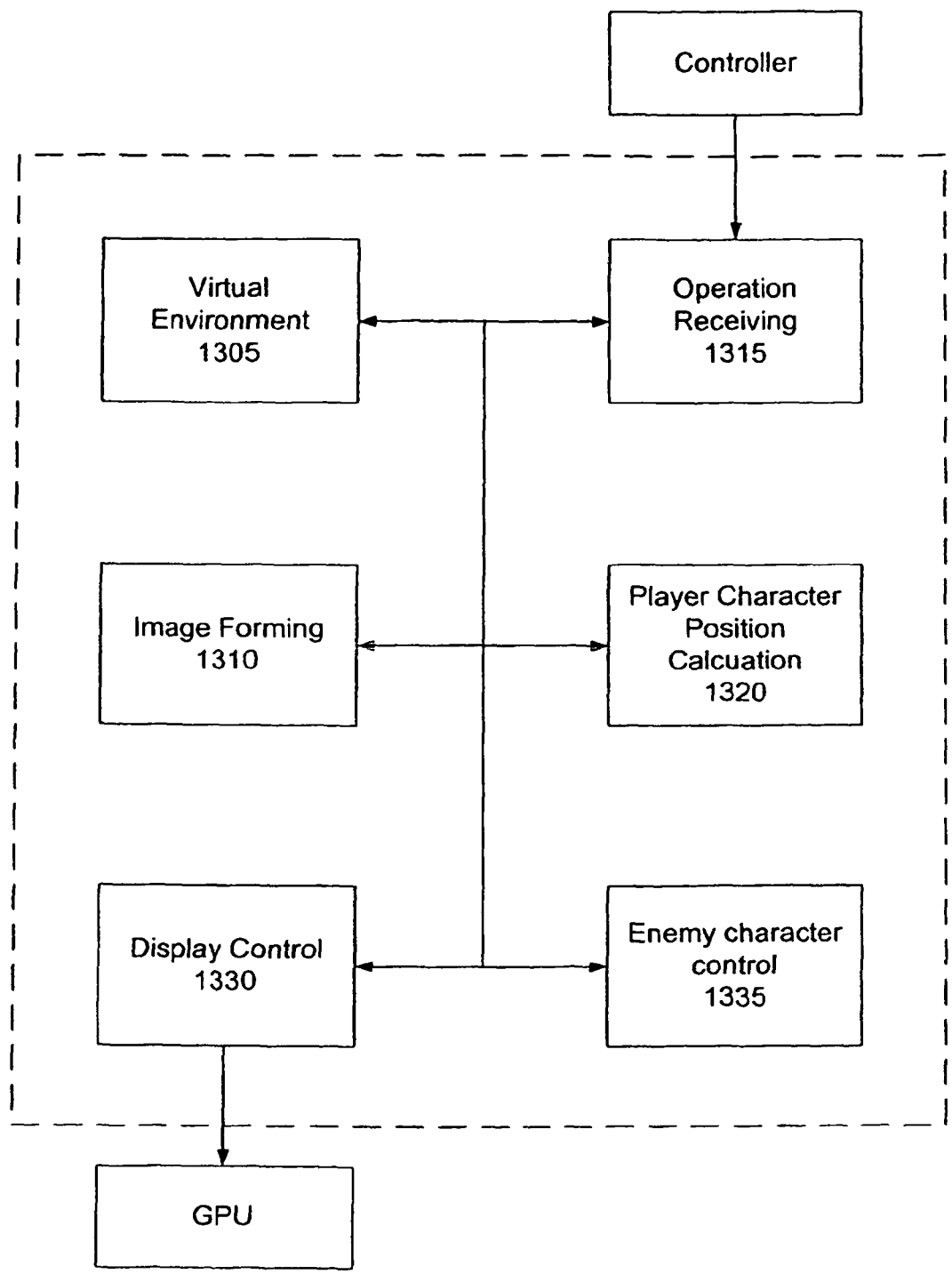
FIG. 13 is an illustration of a block diagram showing an exemplary software structure for implementing a targeting and attack scheme for a video game.

FIG. 13 is a block diagram that shows an exemplary software structure for implementing the game program described herein. A virtual environment data base 1305 stores data that describes the virtual environment. The virtual environment could be a finite, two-dimensional space that is managed as an X-Y coordinate system. Thus, any position in the virtual environment can be specified in the form of coordinates (x,y). The virtual environment could be divided into one or more blocks, wherein each block has a set of attributes that describe a portion of the virtual environment. The attributes could determine geographical information of the virtual environment and could comprise code for expressing a road, a river, a hill, a forest, etc. The blocks could also include image data for creating an image associated with the block.

The software structure also includes an image forming module 1310 that communicates with the virtual environment database 1305. The image forming module 1310 provides position and color information for the GPU.

An operation receiving module 1315 communicates with the controller 120. The operation receiving module 1315 accepts signals from the controller 120 regarding the states of the input interfaces on the controller 120. The operation receiving module 1315 determines an action of the player character in accordance with the game player actuating the controller 120. The operation receiving module 1315 determines movement direction of the player character through the virtual environment and also determines when the player character should initiate attacks. The movement directions of the joysticks 270 are preferably made to correspond to corresponding movements of the player character. The operation receiving module 1315 preferably also determines when the target range indicator 440 should be displayed in response to actuation of an input interface on the controller 120.

A player position calculation module 1320 performs a process for calculating the position and movement of the player character in the virtual environment. In response to signals from the operation receiving module 1315, the player position calculation module 1325 periodically calculates the position of the player character with respect to a previous position in the virtual environment. The player position calculation module 1315 then determines a movement direction for the player character.

A display control module 1330 accepts image information, such as position and color information, from the image forming module 1310 and the player position calculation module 1320 and then forwards rendering instructions to the GPU for processing.

The software structure also includes an enemy control module 1335 that maintains the position of each enemy character. The enemy control module 1335 also controls movement of the enemy characters through the virtual environment.

The present invention has been described above in terms of a presently preferred embodiment so that an understanding of the present invention can be conveyed. There are, however, many configurations for entertainment systems not specifically described herein but with which the present invention is applicable. The present invention should therefore not be seen as limited to the particular embodiments described herein, but rather, it should be understood that the present invention has wide applicability with respect to entertainment systems and video games generally. All modifications, variations, or equivalent arrangements and implementations that are within the scope of the attached claims should therefore be considered within the scope of the invention.

What is claimed is:

1. A method for ordered execution of actions in a game environment, comprising:

receiving an indication of a first object having been targeted in the game environment, the first object targeted in response to manipulation of an input control device coupled to a gaming unit;

assigning the first targeted object to a first target slot, wherein assignment of the first target object occurs in response to the execution of software by a processor in the gaming unit, the software maintained in a storage medium at the gaming unit;

receiving an indication of a second object having been targeted in the game environment, the second object targeted in response to manipulation of the input control device;

assigning the second targeted object to a second target slot, wherein assignment of the second target object occurs in response to execution of the software by the processor, the software maintained in a storage medium;

executing an action in the game environment with respect to each of the targeted objects in response to a command from the input device, wherein the execution of the action with respect to each of the targeted objects occurs in accordance with an order defined by the target slots, the order determined as a result of whether each of the targeted objects is within a predefined range of the action to be executed by a user-controlled object with respect to each of the targeted objects in the game environment; and automatically re-positioning the user-controlled object with respect to each of the targeted objects within the game environment if each of the targeted objects is not within the predefined range of the action to be executed, the executed action displayed on an audio/visual output device coupled to the gaming unit.

2. The method of claim 1, further comprising displaying a visual indicator of the likelihood of successful execution of the action to be executed with respect to each of the targeted objects in the game environment.

3. The method of claim 2, wherein the visual indicator comprises an alteration to an appearance of the targeted object.

4. The method of claim 2, wherein the visual indicator comprises an icon associated with a targeted object.

5. The method of claim 1, further comprising:
freeing a previously assigned target slot from an assignment to a previously targeted object; and
reassigning the freed target slot to a newly targeted object.

6. The method of claim 5, wherein freeing the previously assigned target slot occurs as a result of the previously targeted object having moved beyond a range of the action to be executed with respect to the previously targeted object in the game environment.

7. The method of claim 5, wherein freeing the previously assigned target slots occurs as a result of execution of the action with respect to the previously targeted object in the game environment.

8. The method of claim 5, wherein reassigning the freed target slot to a newly targeted object occurs subject to a predetermined order.

9. The method of claim 5, wherein reassigning the freed target slot to a newly targeted object occurs randomly.

10. A system for ordered execution of actions in a game environment, comprising:
a controller interface coupled to an input control device, the input control device configured to generate input control signals to manipulate actions in the game environment;
a memory device;
a processor coupled to the memory device and the controller interface, the processor configured to:
receive input control signals from the input control device, the input control signals including instructions for the manipulation of a target interface displayed in the game environment,
assign target slots to objects targeted through manipulation of the target interface in the game environment,
store information in the memory device, the information associating the assigned target slots with targeted objects, and
execute an action with respect to each of the targeted objects in response to a command received from the input control device, wherein the execution of the action with respect to each of the targeted objects occurs in accordance with an order defined by the information in the memory device associating the assigned target slots with the targeted objects; and
a graphics processing unit configured to generate a visual indicator associated with the action to be executed with respect to the targeted object in the game environment, wherein the visual indicator is a visual depiction of a controller button associated with the target slot.

11. The system of claim 10, wherein the processor assigns target slots to targeted objects based on proximity of the targeted objects to a user-controlled game object in the game environment.

12. The system of claim 10, wherein the processor assigns target slots to targeted objects based on a capability of a user-controlled game object in the game environment.

13. The system of claim 10, wherein the order defined by the target slots is determined as a result of the proximity of each of the targeted objects to a user-controlled object executing the action with respect to each of the targeted objects in the game environment.

14. The system of claim 10, wherein the order defined by the target slots is determined as a result of whether each of the targeted objects is within a predefined range of the action to be executed by a user-controlled object with respect to each of the targeted objects in the game environment.

15. The system of claim 10, wherein the order defined by the target slots is determined as a result of a likelihood of successful execution of the action to be executed with respect to each of the targeted objects in the game environment.

16. The system of claim 10, wherein the number of target slots corresponds to a number of controller buttons at the input control device.

17. The system of claim 10, wherein the number of target slots corresponds to a number of possible combinations of controller buttons with directional input interfaces at the input control device.

18. The system of claim 10, wherein the executed action comprises attacking a targeted object.

19. The system if claim 10, wherein each of the target slots are associated with a controller button at the input control device.

20. The system of claim 19, wherein the command received from the input control device corresponds to actuation of a controller button at the input control device.

21. The system of claim 19, wherein the association of each controller button at the input control device with a target slot is predetermined.

22. The system of claim 19, wherein the association of each controller button at the input control device with a target slot is random.

23. The system of claim 10, wherein a single target slot is associated with a group of targeted objects.

24. The system of claim 10, wherein the processor is further configured to:
free a previously assigned target slot from an assignment to a previously targeted object; and
reassign the freed target slot to a newly targeted object.

25. The system of claim 24, wherein the processor frees the previously assigned target slot as a result of the previously targeted object having moved beyond a range of the action to be executed with respect to the previously targeted object in the game environment.

26. The system of claim 24, wherein the processor frees the previously assigned target slot as a result of execution of the action with respect to the previously targeted object in the game environment.

* * * * *